United States Patent
Tanabe et al.

(10) Patent No.: US 9,863,818 B2
(45) Date of Patent: Jan. 9, 2018

(54) TEMPERATURE DETECTING APPARATUS AND COMPUTER PROGRAM THEREFOR

(71) Applicant: SHINDENGEN ELECTRIC MANUFACTURING CO., LTD., Tokyo (JP)

(72) Inventors: Tomohiro Tanabe, Saitama (JP); Kazuya Okabe, Saitama (JP); Daisuke Hagiwara, Saitama (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 516 days.

(21) Appl. No.: 14/565,185

(22) Filed: Dec. 9, 2014

(65) Prior Publication Data

US 2015/0160074 A1 Jun. 11, 2015

(30) Foreign Application Priority Data

Dec. 11, 2013 (JP) ................................. 2013-256362

(51) Int. Cl.
*G01K 7/00* (2006.01)
*G01K 7/42* (2006.01)

(52) U.S. Cl.
CPC ..................... *G01K 7/42* (2013.01)

(58) Field of Classification Search
USPC ..................................................... 374/1, 185
See application file for complete search history.

(56) References Cited

U.S. PATENT DOCUMENTS

| 8,148,929 B2* | 4/2012 | Wei | H02M 1/32 318/400.2 |
| 8,771,516 B2* | 7/2014 | Krause | B01D 69/088 210/321.6 |
| 8,829,839 B1* | 9/2014 | Vrankovic | H02K 11/0094 318/471 |
| 9,035,689 B2* | 5/2015 | Bhangu | H03K 17/145 327/378 |
| 2012/0217795 A1 | 8/2012 | Hasegawa et al. | |

(Continued)

FOREIGN PATENT DOCUMENTS

| JP | 2006-237331 A | 9/2006 |
| JP | 2008-005615 A | 1/2008 |
| JP | 2009-168527 A | 7/2009 |

(Continued)

OTHER PUBLICATIONS

Japan Patent Office, Office Action for Japanese patent application No. 2013-256362, dated Mar. 28, 2017.

*Primary Examiner* — Mirellys Jagan (57) ABSTRACT

A temperature detecting apparatus detects a temperature of a detection target having a switch element. The temperature detecting apparatus includes a current detecting unit and a temperature estimating unit. The current detecting unit detects an output current from the detection target changing depending on an on/off operation of the switch element. The temperature estimating unit, on the basis of a current value detected by the current detecting unit, calculates a conduction loss of the switch element and a switching loss of the switch element to estimate the temperature of the detection target on the basis of the calculated conduction loss and the calculated switching loss.

5 Claims, 3 Drawing Sheets

(56) References Cited

U.S. PATENT DOCUMENTS

| | | | | |
|---|---|---|---|---|
| 2013/0119912 A1* | 5/2013 | Ayano | ................... | H02M 1/32 |
| | | | | 318/472 |
| 2013/0188397 A1* | 7/2013 | Wu | ................. | H02M 3/33576 |
| | | | | 363/17 |

FOREIGN PATENT DOCUMENTS

| JP | 2011-097812 A | 5/2011 |
|---|---|---|
| JP | 2012-010490 A | 1/2012 |

* cited by examiner

TEMPERATURE DETECTING APPARATUS AND COMPUTER PROGRAM THEREFOR

CROSS REFERENCE TO RELATED APPLICATIONS

This application is based on and claims the benefit of priority to Japanese Patent Application No. 2013-256362 filed on Dec. 11, 2013, the contents of which are hereby incorporated by reference in their entirety.

TECHNICAL FIELD

The present invention relates to a temperature detecting apparatus and a computer program therefor.

BACKGROUND ART

In a conventional technique, when a temperature of a detection target such as an element or an apparatus is to be detected, a temperature sensor such as a thermistor may be used (for example, see Patent Document 1). The temperature sensor detects its own temperature to detect the temperature of a detection target. For this reason, the temperature sensor is arranged such that heat of the detection target is easily transmitted to the temperature sensor.

CITATION LIST

Patent Literature

PTL 1: Unexamined Japanese Patent Publication No. 2006-237331

SUMMARY OF THE INVENTION

Technical Problem

Heat generated from a detection target is transmitted to a temperature sensor through a material interposed between the detection target and the temperature sensor. For this reason, a time is taken until a change in temperature of the temperature sensor is completed after heat is generated from the detection target and then transmitted to the temperature sensor. This time becomes long as a change in temperature of the detection target per unit time increases. Thus, when the temperature of the detection target sharply changes, the temperature sensor cannot follow the change in temperature, and a detection value of the temperature sensor may be largely different from the temperature of the detection target.

In consideration of the above problem, the present invention has as its object to accurately detect a temperature of a detection target even though the temperature of the detection target sharply changes.

Solution to Problem

The present invention proposes the following items to solve the above problem.

Figure 1:
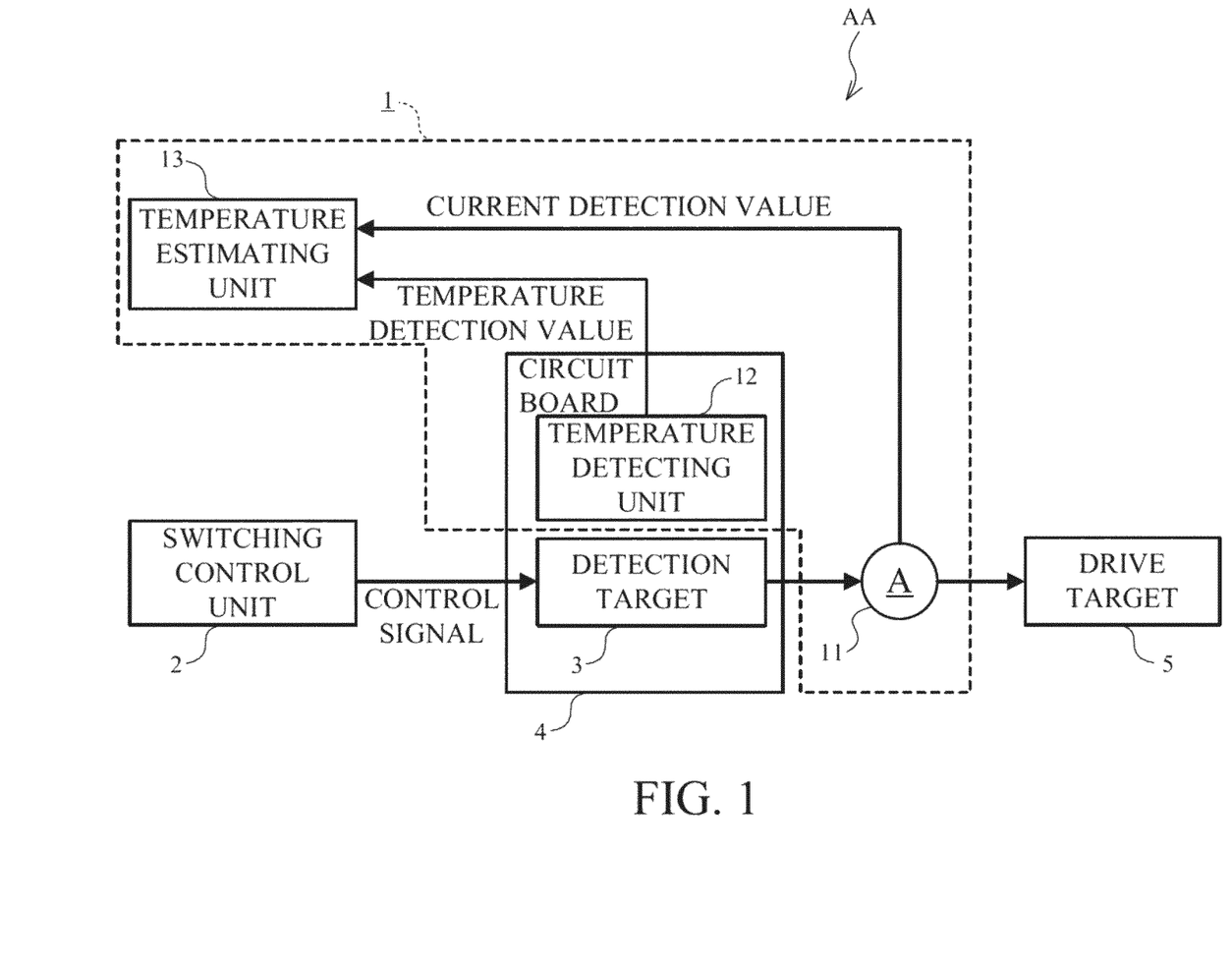
FIG. 1 is a block diagram of a drive apparatus including a temperature detecting apparatus according to one embodiment of the present invention.

(1) The present invention proposes a temperature detecting apparatus (for example, corresponding to a temperature detecting apparatus 1 in FIG. 1) that detects a temperature of a detection target (for example, corresponding to a detection target 3 in FIG. 1) having a switch element, including: a current detecting unit (for example, corresponding to a current detecting unit 11 in FIG. 1) that detects an output current from the detection target changing depending on an on/off operation of the switch element; and a temperature estimating unit (for example, corresponding to a temperature estimating unit 13 in FIG. 1) that obtains a conduction loss (for example, corresponding to a conduction loss $T_1$ (will be described later)) of the switch element and a switching loss (for example, corresponding to a switching loss $T_2$ (will be described later)) of the switch element on the basis of a current value detected by the current detecting unit to estimate the temperature of the detection target on the basis of the obtained conduction loss and the obtained switching loss.

Here, the temperature of the detection target can also be estimated from the conduction loss and the switching loss of the switch element, and the conduction loss and the switching loss can be obtained from the output current from the detection target. The output current from the detection target and the temperature of the detection target have a correlation.

Thus, according to the invention, the current detecting unit is designed to detect an output current from the detection target changing depending on an on/off operation of the switch element. The temperature estimating unit is designed to obtain a conduction loss and a switching loss of the switch element on the basis of a detection result obtained by the current detecting unit and to estimate the temperature of the detection target on the basis of the conduction loss and the switching loss. For this reason, a sharp change in temperature of the detection target is also reflected on an estimation result of the temperature of the detection target. Thus, even though the temperature of the detection target sharply changes, the temperature of the detection target can be accurately detected.

(2) The present invention proposes the temperature detecting apparatus of (1), including a temperature detecting unit (for example, corresponding to a temperature detecting unit 12 in FIG. 1) that detects a temperature of the detection target by detecting its own temperature, wherein the temperature estimating unit defines any one of a detection result (for example, corresponding to a temperature detection value (will be described later)) obtained by the temperature detecting unit and an estimation result (for example, corresponding to a temperature estimation value (will be described later)) obtained by the temperature estimating unit as the temperature of the detection target.

According to the invention, in the temperature detecting apparatus of (1), the temperature detecting unit that detects a temperature of the detection target by detecting its own temperature is arranged, and any one of the detection result obtained by the temperature detecting unit and the estimation result obtained by the temperature estimating unit is defined as a temperature of the detection target by the temperature estimating unit. For this reason, a result to be employed as a temperature of the detection target can be switched between the detection result obtained by the temperature detection unit and the estimation result obtained by the temperature estimating unit. Thus, with the switching, a result closer to an actual temperature of the detection target of the detection result obtained by the temperature detection unit and the estimation result obtained by the temperature estimating unit can be employed as the temperature of the detection target.

Figure 3:
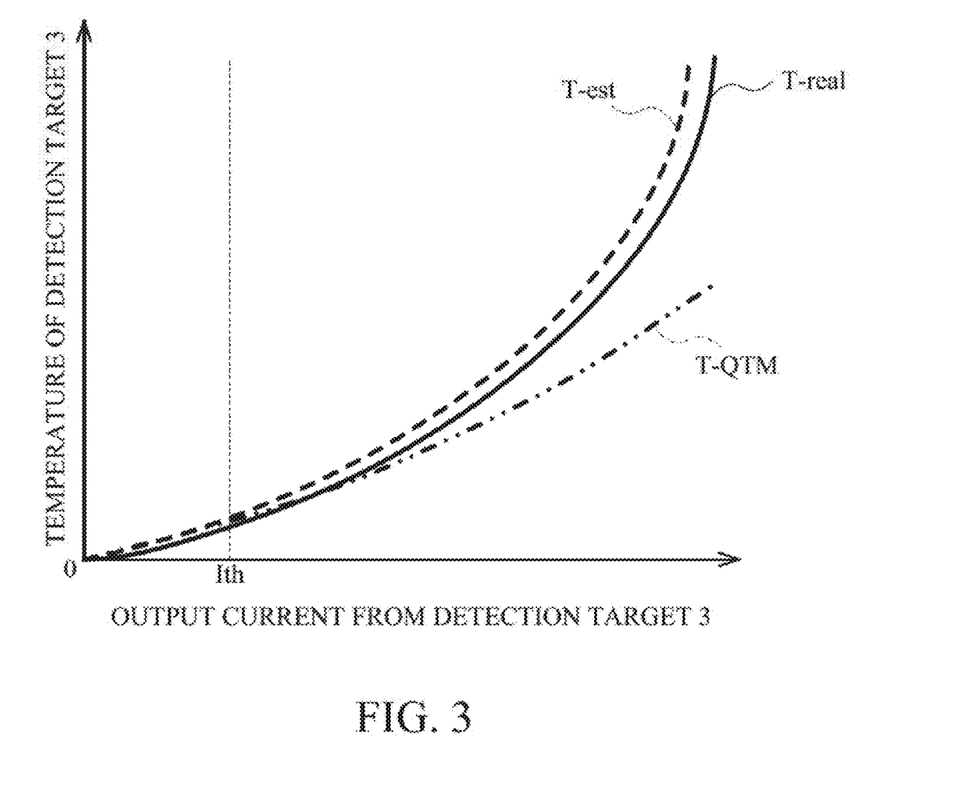
FIG. 3 is a graph showing a relationship between a temperature of a detection target and an output current according to the embodiment of the present invention.

(3) The present invention proposes the temperature detecting apparatus of (2) wherein the temperature estimating unit, when a current value detected by the current detecting unit is smaller than a predetermined threshold value (for example, corresponding to a switching current threshold value Ith in FIG. 3), defines a detection result obtained by the temperature detecting unit as the temperature of the detection target and, when the current value detected by the current detecting unit is greater than or equal to the threshold value, defines an estimation result obtained by the temperature estimating unit as the temperature of the detection target.

According to the invention, in the temperature detecting apparatus of (2), the temperature estimating unit, when the current value detected by the current detecting unit is smaller than the threshold value, defines the detection result obtained by the temperature detecting unit as the temperature of the detection target and, when the current value detected by the current detecting unit is greater than or equal to the threshold value, defines the estimation result obtained by the temperature estimating unit as the temperature of the detection target. For this reason, by setting the threshold value, a result to be employed as the temperature of the detection target can be switched between the detection result obtained by the temperature detecting unit and the estimation result obtained by the temperature estimating unit depending on the temperature of the detection target.

(4) The present invention proposes the temperature detecting apparatus of (2), wherein the temperature estimating unit, when a difference between an estimation result obtained by the temperature estimating unit and a detection result obtained by the temperature detecting unit is smaller than a predetermined threshold value (for example, corresponding to a switching temperature threshold value Tth (will be described later)), defines the detection result obtained by the temperature detecting unit as a temperature of the detection target and, when the difference is greater than or equal to the threshold value, defines the estimation result obtained by the temperature estimating unit as the temperature of the detection target.

According to the invention, in the temperature detecting apparatus of (2), the temperature estimating unit, when a difference between the estimation result obtained by the temperature estimating unit and the detection result obtained by the temperature detecting unit is smaller than the threshold value, defines the detection result obtained by the temperature detecting unit as the temperature of the detection target and, when the difference is greater than or equal to the threshold value, defines the estimation result obtained by the temperature estimating unit as the temperature of the detection target. For this reason, by setting the threshold value, a result to be employed as the temperature of the detection target can be switched between the detection result obtained by the temperature detecting unit and the estimation result obtained by the temperature estimating unit depending on the differences.

(5) The present invention proposes the temperature detecting apparatus of any one of (2) to (4) wherein the temperature detecting unit is a thermistor.

According to the invention, in the temperature detecting apparatus of any one of (2) to (4), a thermistor can be applied as the temperature detecting unit.

(6) The present invention proposes the temperature detecting apparatus of any one of (1) to (5), including a voltage detecting unit (for example, corresponding to a voltage detecting unit (will be described later)) that detects an output voltage from the detection target changing depending on an on/off operation of the switch element, wherein the temperature estimating unit obtains a switching loss of the switch element by using a detection result obtained by the voltage detecting unit.

In order to obtain the switching loss, an output voltage from the detection target changing depending an on/off operation of the switch element is used.

Thus, according to the invention, in the temperature detecting apparatus of anyone of (1) to (5), the voltage detecting unit that detects the output voltage from the detection target changing depending on the on/off operation of the switch element is arranged to cause the temperature estimating unit to obtain the switching loss of the switch element by using a detection result obtained by the voltage detecting unit. For this reason, even though the output voltage from the detection target changes, the switching loss can be accurately obtained to make it possible to accurately detect the temperature of the detection target.

(7) The present invention provides a computer program product having a non-transitory computer (for example, corresponding to a temperature estimating unit 13 in FIG. 1) readable medium storing a program which, when executed by a computer, causes the computer to perform a temperature detecting method for detecting a temperature of a detection target (for example, corresponding to a detection target 3 in FIG. 1) having a switch element. The temperature detecting method including: the first step (for example, corresponding to a process performed by the temperature estimating unit 13 in FIG. 1 that acquires a current detection value of the current detecting unit 11 in FIG. 1) of acquiring a detection result of an output current from the detection target, and the second step (for example, corresponding to a process performed by the temperature estimating unit 13 in FIG. 1) of obtaining a conduction loss (for example, corresponding to a conduction loss $T_1$ (will be described later)) of the switch element and a switching loss (for example, corresponding to switching loss $T_2$ (will be described later)) of the switch element on the basis of a current value acquired in the first step to estimate a temperature of the detection target on the basis of the obtained conduction loss and the obtained switching loss.

According to the invention, the program is executed by using the computer to detect an output current from the detection target changing depending on an on/off operation of the switch element. A conduction loss and a switching loss of the switch element are obtained on the basis of the detection result described above to estimate the temperature of the detection target on the basis of the conduction loss and the switching loss. For this reason, a sharp change in temperature of the detection target is also consequently reflected on an estimation result of the temperature of the detection target. Thus, even though the temperature of the detection target sharply changes, the temperature of the detection target can be accurately detected.

Effect of the Invention

According to the present invention, even though a temperature of a detection target sharply changes, the temperature of the detection target can be accurately detected.

DETAILED DESCRIPTION OF PREFERRED EMBODIMENTS

An embodiment of the present invention will be described below with reference to the accompanying drawings. Note that constituent elements in the following embodiment can be arbitrarily replaced with existing constituent elements or the like. Various variations including combinations of the constituent elements and other existing constituent elements can be effected. Thus, the description of the following embodiment does not limit the contents of the invention described in the scope of claims.

FIG. 1 is a block diagram of a drive apparatus AA including a temperature detecting apparatus 1 according to one embodiment of the present invention. The drive apparatus AA is to supply an electric power to a drive target 5, and includes the temperature detecting apparatus 1, a switching control unit 2, and a detection target 3.

The detection target 3 has a switch element, turns on/off the switch element depending on a control signal supplied from the switching control unit 2, and outputs an electric power to the drive target 5. The detection target 3 is formed on a circuit board 4.

The temperature detecting apparatus 1 detects a temperature of the detection target 3. The temperature detecting apparatus 1 includes a current detecting unit 11, a temperature detecting unit 12, and a temperature estimating unit 13.

The current detecting unit 11 is configured by, for example, a current sensor to detect an output current from the detection target 3 changing depending on an on/off operation of the switch element.

The temperature detecting unit 12 is configured by, for example, a thermistor and detects its own temperature to detect the temperature of the detection target 3. The temperature detecting unit 12, like the detection target 3, is formed on the circuit board 4.

The temperature estimating unit 13 estimates the temperature of the detection target 3 on the basis of a current detection value of the current detecting unit 11 and defines any one of a temperature estimation value and a temperature detection value of the temperature detecting unit 12 as the temperature of the detection target. The temperature estimating unit 13 is configured by a microcomputer such as an MCU (Micro Controller Unit) or an MPU (Micro Processing Unit), and executes a program stored in a non-transitory storage medium to achieve processes (will be described below). As the storage medium described above, for example, a ROM (Read Only Memory) arranged on a microcomputer, a nonvolatile memory such as an EPROM or a flash memory, a magnetic disk such as a hard disk, a CD-ROM, or the like can be applied.

Figure 2:
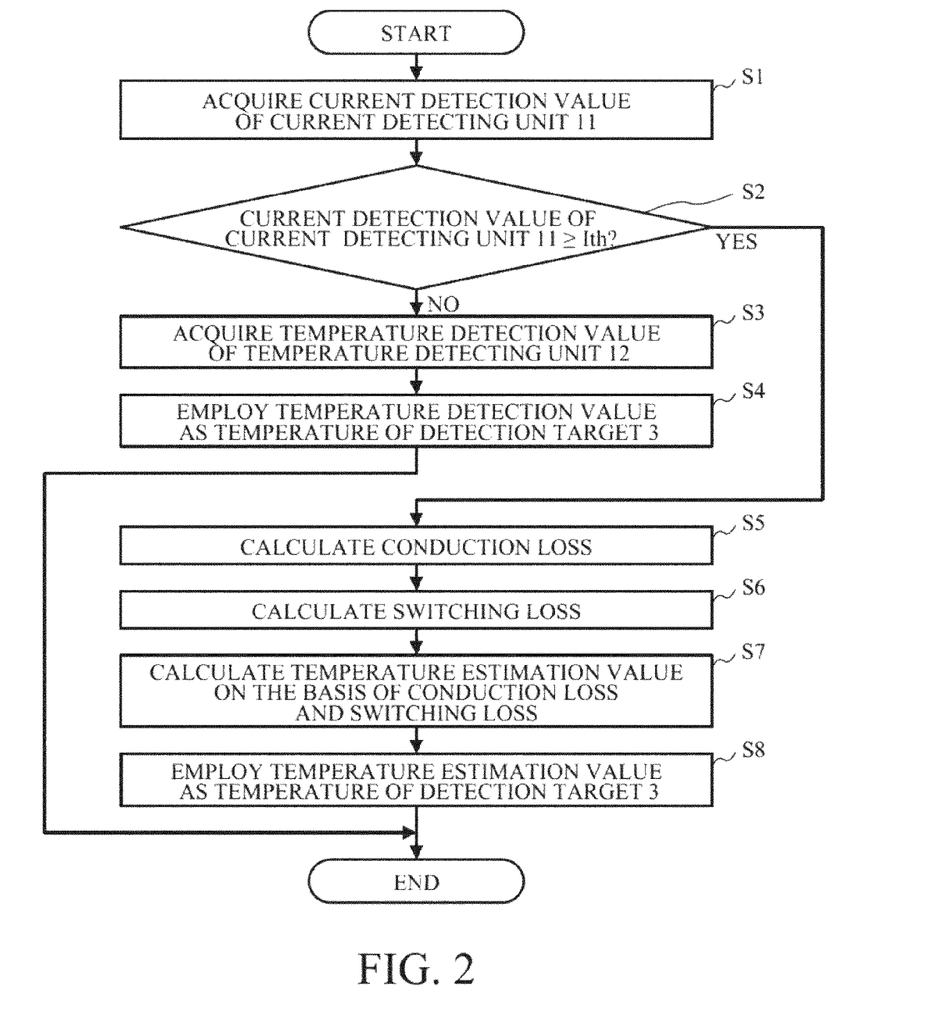
FIG. 2 is a flow chart showing a process of the temperature detecting apparatus according to the embodiment of the present invention.

FIG. 2 is a flow chart showing a process of the temperature detecting apparatus 1.

In step S1, the temperature detecting apparatus 1 causes the temperature estimating unit 13 to acquire a detection result of an output current from the detection target 3 obtained by the current detecting unit 11 to shift the process to step S2.

In step S2, the temperature detecting apparatus 1 causes the temperature estimating unit 13 to compare a current value acquired in step S1 with a predetermined switching current threshold value Ith. When it is determined that the current value acquired in step S1 is smaller than the switching current threshold value Ith, the process is shifted to step S3. When it is determined that the current value acquired in step S1 is greater than or equal to the switching current threshold value Ith, the process is shifted to step S5.

The switching current threshold value Ith will be described below in detail with reference to FIG. 3. In FIG. 3, the ordinate indicates a temperature of the detection target 3, and the abscissa indicates an output current from the detection target 3. A curve denoted by T-real shows a relationship between the output current from the detection target 3 and an actual temperature of the detection target 3. The curve denoted by T-est shows a relationship between the output current from the detection target 3 and a temperature of the detection target 3 estimated by the temperature estimating unit 13. Reference symbol T-QTM denotes a relationship between the output current from the detection target 3 and a temperature of the detection target 3 detected by the temperature detecting unit 12.

A curve denoted by T-QTM is very close to the curve denoted by T-real in a region in which the output current from the detection target 3 is small. However, the curve denoted by T-QTM gets away from the curve denoted by T-real as the output current from the detection target 3 increases. As the reason why the curve denoted by T-QTM gets away from the curve denoted by T-real as the output current from the detection target 3 increases, the following first reason is conceived.

The first reason is that the temperature detecting unit 12 cannot follow a sharp change in temperature of the detection target 3. As described above, a time is taken until the change in temperature of the temperature detecting unit 12 is completed after heat is generated by the detection target 3 and transmitted to the temperature detecting unit 12. This time becomes long as a change in temperature of the detection target 3 per unit time increases. As is apparent from the curve denoted by T-real, as the output current from the detection target 3 increases, a change in actual temperature of the detection target 3 increases. As described above, it is conceived that as the output current from the detection target 3 increases, a difference between the actual temperature of the detection target 3 and the temperature detection value of the temperature detecting unit 12 increases.

On the other hand, the curve denoted by T-est, in a region in which the output current from the detection target 3 is small, is distant from the curve denoted by the T-real more than the curve denoted by T-QTM. However, the curve denoted by T-est, even though the output current from the detection target 3 increases, is closer to the curve denoted by T-real than the curve denoted by T-QTM. As the reason why the curve denoted by T-est is distant from the curve denoted by T-real more than the curve denoted by T-QTM in the region in which the output current from the detection target 3 is small, the following second reason is conceived.

The second reason is current detection accuracy of the current detecting unit 11. The current detection accuracy of the current detecting unit 11 is deteriorated as a current to be detected decreases. For this reason, as a range of the current detecting unit 11 is widened, the current detection accuracy of the current detecting unit 11 at a low frequency is deteriorated. Thus, it is conceived that as the output current from the detection target 3 decreases, a difference between an actual temperature of the detection target 3 and a temperature estimation value of the temperature estimating unit 13 estimated by using the current detection result of the current detecting unit 11 increases.

For this reason, in the region in which the output current from the detection target 3 is small, the temperature detection value of the temperature detecting unit 12 is employed as the temperature of the detection target 3. In a region in which the output current from the detection target 3 is large, the temperature estimation value of the temperature estimating unit 13 is employed as the temperature of the detection target 3.

Thus, an output current from the detection target 3 used when a value to be employed as the temperature of the detection target 3 is switched between the temperature detection value of the temperature detecting unit 12 and the temperature estimation value of the temperature estimating unit 13 is set as the switching current threshold value Ith described above. In the embodiment, an output current from the detection target 3 at a point of time at which the difference between the temperature detection value of the temperature detecting unit 12 and the temperature estimation value of the temperature estimating unit 13 is larger than a predetermined threshold value (for example, zero) is calculated in advance, and the calculated output current from the detection target 3 is set as the switching current threshold value Ith.

Returning to FIG. 2, in step S3, the temperature detecting apparatus 1 causes the temperature estimating unit 13 to acquire a detection result of the temperature of the detection target 3 obtained by the temperature detecting unit 12 to shift the process to step S4.

In step S4, the temperature detecting apparatus 1 causes the temperature estimating unit 13 to employ the detection result by the temperature detecting unit 12 acquired in step S3 as the temperature of the detection target 3 to end the process in FIG. 2.

In step S5, the temperature detecting apparatus 1 causes the temperature estimating unit 13 to calculate a conduction loss $T_1$ of the switch element included in the detection target 3 to shift the process to step S6. The conduction loss $T_1$ is calculated by using the following expression (1).

[Expression 1]

$$T_1 = I_{in}^2 \times K_1 \times t \quad (1)$$
$$= I_{in}^2 \times R_{on} \times \theta_{jc} \times t$$

Reference symbol $I_{in}$ denotes a current detection value of the current detecting unit 11, and reference symbol $K_1$ denotes a conduction loss temperature estimation coefficient. Reference symbol t denotes a time until the temperature estimating unit 13 completes estimation of the temperature of the detection target 3 after the temperature estimating unit 13 starts acquisition of the current detection value of the current detecting unit 11. Reference symbol $R_{on}$ denotes an ON resistance of the switch element included in the detection target 3. Reference symbol $\theta_{jc}$ denotes a thermal resistance between a junction of the switch element included in the detection target 3 and a case (package) of the switch element.

In step S6, the temperature detecting apparatus 1 causes the temperature estimating unit 13 to calculate a switching loss $T_2$ of the switch element included in the detection target 3 to shift the process to step S7. The switching loss $T_2$ is calculated by using the following expression (2).

[Expression 2]

$$T_2 = I_{in} \times V_{out} \times K_2 \times t \quad (2)$$
$$= \left\{ I_{in} \times V_{out} \times \frac{1}{6} \times (t_f + t_r) \right\} \times fs \times \theta_{jc} \times t$$

Reference symbol $K_2$ denotes a switching loss temperature estimation coefficient of the switch element included in the detection target 3. Reference symbol $t_f$ denotes a fall time of a drain-source voltage of the switch element included in the detection target 3, and reference symbol $t_r$ denotes a rise time of the drain-source voltage of the switch element included in the detection target 3. Reference symbol $f_s$ denotes an oscillation frequency of the switch element included in the detection target 3. Reference symbol $V_{out}$ denotes an output voltage output from the detection target 3 to the drive target 5. In the embodiment, it is assumed that the switching control unit 2 and the detection target 3 perform constant-voltage control. For this reason, in the embodiment, the value $V_{out}$ is a predetermined constant voltage.

In step S7, the temperature detecting apparatus 1 causes the temperature estimating unit 13 to estimate a temperature of the detection target 3 on the basis of the conduction loss $T_1$ calculated in step S5 and the switching loss $T_2$ calculated in step S6 and calculates a temperature estimation value T to shift the process to step S8. The temperature estimation value T is calculated by using the following expression (3).

[Expression 3]

$$T = (I_{in}^2 R_{on} + \alpha) \times \theta_{jc} \times t \quad (3)$$
$$= T_1 + T_2$$

Reference symbol α denotes a switching loss coefficient.

In step S8, the temperature detecting apparatus 1 causes the temperature estimating unit 13 to employ a calculation result calculated in step S7 as the temperature of the detection target 13 to end the process in FIG. 2.

The temperature detecting apparatus 1 described above can exert the following effect.

The temperature detecting apparatus 1 causes the current detecting unit 11 to detect an output current from the detection target 3 changing depending on an on/off operation of the switch element. The temperature estimating unit 13 calculates the conduction loss $T_1$ and the switching loss $T_2$ of the switch element on the basis of a detection result obtained by the current detecting unit 11 and estimates the temperature of the detection target 3 on the basis of the conduction loss $T_1$ and the switching loss $T_2$. For this reason, a sharp change in temperature of the detection target 3 is also reflected on the temperature estimation value of the temperature estimating unit 13. Thus, even though the temperature of the detection target 3 sharply changes, the temperature of the detection target 3 can be accurately detected.

The temperature detecting apparatus 1 switches a value to be employed as the temperature of detection target 3 between the temperature detection value of the temperature detecting unit 12 and the temperature estimation value of the temperature estimating unit 13 depending on an output current from the detection target 3. For this reason, the result to be employed as the temperature of the detection target 3 can be switched between the temperature detection value of the temperature detecting unit 12 and the temperature estimation value of the temperature estimating unit 13 depending on the temperature of the detection target 3.

The present invention is not limited to the embodiment described above, and various changes and applications of the invention can be effected without departing from the spirit and scope of the invention.

For example, in the embodiment described above, depending on the output current from the detection target 3, a value to be employed as the temperature of the detection target 3 is switched between the temperature detection value of the temperature detecting unit 12 and the temperature estimation value of the temperature estimating unit 13.

However, the configuration is not always employed, and, for example, a value to be employed as the temperature of the detection target 3 may be switched between the temperature detection value of the temperature detecting unit 12 and the temperature estimation value of the temperature estimating unit 13 depending on a difference between the temperature detection value of the temperature detecting unit 12 and the temperature estimation value of the temperature estimating unit 13. More specifically, when the difference described above is smaller than the switching temperature threshold value Tth, the temperature detection value of the temperature detecting unit 12 may be employed as the temperature of the detection target 3. When the difference described above is greater than or equal to the switching threshold value Tth, the temperature estimation value of the temperature estimating unit 13 may be employed as the temperature of the detection target 3. With respect to the switching temperature threshold value Tth, for example, a difference (to be referred to as a first difference hereinafter) between an actual temperature of the detection target 3 and the temperature detection value of the temperature detecting unit 12 is calculated in advance, and a difference (to be referred to as a second difference hereinafter) between the actual temperature of the detection target 3 and the temperature estimation value of the temperature estimating unit 13 is calculated in advance. A difference between the temperature detection value of the temperature detecting unit 12 and the temperature estimation value of the temperature estimating unit 13 at a point of time at which the first difference and the second difference are equal to each other is calculated in advance, and the calculated difference may be set as the switching temperature threshold value Tth.

In the embodiment described above, an output current from the detection target 3 obtained at a point of time at which a difference between the temperature detection value of the temperature detecting unit 12 and the temperature estimation value of the temperature estimating unit 13 is larger than a predetermined threshold value (for example, zero) is calculated in advance, and the calculated output current from the detection target 3 is set as the switching current threshold value Ith. However, this configuration is not always used, for example, a difference between the first difference and the second difference described above is calculated in advance, and an output current from the detection target 3 at a point of time at which the first difference and the second difference are equal to each other is calculated in advance. The calculated output current from the detection target 3 may be set as the switching current threshold value Ith.

In the embodiment described above, although it is assumed that the switching control unit 2 and the detection target 3 perform constant-voltage control, the switching control unit 2 and the detection target 3 do not always the constant-voltage control. When the output voltage from the detection target 3 changing depending on an on/off operation of the switch element changes, a voltage detecting unit that detects the output voltage from the detection target 3 may be arranged in the temperature detecting apparatus 1. In this manner, when the voltage detection value of the voltage detecting unit is used as the voltage $V_{out}$ described above, the switching loss $T_2$ can be accurately calculated by Expression (2). For this reason, even though an output voltage from the detection target 3 changes, the temperature of the detection target 3 can be accurately detected.

REFERENCE MARKS IN THE DRAWINGS

AA; drive apparatus
1; temperature detecting apparatus
2; switching control unit
3; detection target
11; current detecting unit
12; temperature detecting unit
13; temperature estimating unit

The invention claimed is:

1. A temperature detecting apparatus that detects a temperature of a detection target having a switch element, comprising:
   a current detecting unit that detects an output current from the detection target changing depending on an on/off operation of the switch element;
   a temperature estimating unit that obtains a conduction loss of the switch element and a switching loss of the switch element on the basis of a current value detected by the current detecting unit and estimates the temperature of the detection target on the basis of the obtained conduction loss and the obtained switching loss; and
   a temperature detecting unit that detects the temperature of the detection target by detecting its own temperature,
   wherein the temperature estimating unit,
   when the current value detected by the current detecting unit is smaller than a predetermined threshold value, defines a detection result obtained by the temperature detecting unit as the temperature of the detection target and,
   when the current value detected by the current detecting unit is greater than or equal to the predetermined threshold value, defines an estimation result obtained by the temperature estimating unit as the temperature of the detection target.

2. The temperature detecting apparatus according to claim 1, wherein
   the temperature detecting unit is a thermistor.

3. The temperature detecting apparatus according to claim 1, comprising
   a voltage detecting unit that detects an output voltage from the detection target changing depending on an on/off operation of the switch element, wherein
   the temperature estimating unit obtains a switching loss of the switch element by using a detection result obtained by the voltage detecting unit.

4. A temperature detecting apparatus that detects a temperature of a detection target having a switch element, comprising:
   a current detecting unit that detects an output current from the detection target changing depending on an on/off operation of the switch element;
   a temperature estimating unit that obtains a conduction loss of the switch element and a switching loss of the switch element on the basis of a current value detected by the current detecting unit and estimates the temperature of the detection target on the basis of the obtained conduction loss and the obtained switching loss; and
   a temperature detecting unit that detects the temperature of the detection target by detecting its own temperature,
   wherein
   the temperature estimating unit,
   when a difference between an estimation result obtained by the temperature estimating unit and a detection result obtained by the temperature detecting unit is smaller than a predetermined threshold value, defines the detection result obtained by the temperature detecting unit as the temperature of the detection target, when the difference is greater than or equal to the predetermined threshold value, defines the estimation result obtained by the temperature estimating unit as the temperature of the detection target.

5. A computer program product having a non transitory computer readable medium storing a program which, when executed by a computer, causes the computer to perform a temperature detecting method for detecting a temperature of a detection target having a switch element, the temperature detecting method including:

a first step of acquiring a detection result of an output current from the detection target;

a second step of obtaining a conduction loss of the switch element and a switching loss of the switch element on the basis of a current value acquired in the first step and estimating the temperature of the detection target on the basis of the obtained conduction loss and the obtained switching loss; and a third step of detecting the temperature of the detection target by detecting its own temperature, wherein when the current value detected in the first step is smaller than a predetermined threshold value, the detection result obtained in the first step is defined as the temperature of the detection target and, when the current value detected in the first step is greater than or equal to the predetermined threshold value, an estimation result obtained in the second step is defined as the temperature of the detection target.

* * * * *